United States Patent [19]

Pistiner

[11] 4,230,294
[45] Oct. 28, 1980

[54] CLOSED LOOP ROLL CONTROL FOR MOMENTUM BIASED SATELLITES

[75] Inventor: Josef S. Pistiner, Lafayette Hill, Pa.

[73] Assignee: RCA Corporation, New York, N.Y.

[21] Appl. No.: 60,029

[22] Filed: Jul. 23, 1979

[51] Int. Cl.³ .............................................. B64G 1/38
[52] U.S. Cl. ................................... 244/170; 244/165; 244/171
[58] Field of Search ............... 244/164, 165, 170, 171, 244/3.2, 3.21; 364/434, 459; 318/584, 648, 649

[56] References Cited

U.S. PATENT DOCUMENTS

| | | | |
|---|---|---|---|
| 3,424,401 | 1/1969 | Maurer | 244/165 |
| 3,591,108 | 7/1971 | Perkel | 244/165 |
| 3,999,729 | 12/1976 | Muhlfelder et al. | 244/165 |
| 4,071,211 | 1/1978 | Muhlfelder et al. | 244/165 |

*Primary Examiner*—Charles E. Frankfort
*Attorney, Agent, or Firm*—Samuel Cohen; Joseph D. Lazar; Robert L. Troike

[57] ABSTRACT

An attitude control and stabilization system for momentum biased satellites utilizing a pair of counterrotating flywheels mounted parallel to its yaw axis. The speed of one of the wheels of the pair is controlled by sensing and correcting the roll axis errors of the satellite.

9 Claims, 4 Drawing Figures

CLOSED LOOP ROLL CONTROL FOR MOMENTUM BIASED SATELLITES

This invention relates to attitude control and stabilization of dual-spin type satellites, and more particularly, to a closed loop roll control and active nutation damping system for such satellites.

Present attitude and stabilization systems for earth pointing, dual-spin satellites employing a bias momentum wheel for stabilization, control the pitch attitude by modulating the momentum wheel angular momentum about a non-zero value. Gyroscopic stiffness of such satellites provides inertial stability whereby the pitch axis is aligned to the orbit normal and the yaw axis (interchanging with the roll axis on a quarter-orbit basis) is aligned to the local vertical. Roll attitude control can be achieved by interaction of the earth's magnetic field with magnetic coil dipoles aboard the spacecraft. Nutation damping may be achieved by means of passive fluid dampers and by active means. See U.S. Pat. No. 3,830,447, issued on Aug. 20, 1974, to K. J. Phillips for a description of a system for momentum bias control of the pitch axis providing active nutation damping. Also see U.S. Pat. No. 3,834,653, issued on Sept. 10, 1974 to Harold Perkel, for a description of a closed loop roll and yaw control system using magnetic dipoles.

Pitch attitude errors are usually determined by comparison of a so-called horizon-splitting pulse with a body position zero-error reference or index pulse. Roll errors on the other hand, are, in some systems, computed on the ground from the horizon sensor's earth-time, the sensor scan rate, and the spacecraft ephemerides. Nulling of such a determined roll error is then accomplished by transmission of appropriate commands to the magnetic coil torquing system abroad the spacecraft. In other systems, roll errors are sensed by earth horizon scan sensors providing error signals in a closed loop torque correcting system.

There are shortcomings associated with the present systems for roll attitude control. These shortcomings include, in so-called "open loop," i.e., in ground-controlled systems, relatively slower response times compared to "closed loop" pitch loop response times, and power and weight requirements which increase rapidly with spacecraft altitude for magnetic systems.

Nutation control by means of passive fluid dampers, although adequate for some spacecraft missions, are not suitable for some missions requiring strict, and rapid performance, primarily, because of slow response time, as well as the weight and size requirements. Active nutation control systems such as described in the aforementioned U.S. Pat. No. 3,830,447, provide only nutation damping but not roll attitude or position control.

Nutation control using a single wheel rotating about an axis parallel to the yaw axis is described in U.S. Pat. No. 3,591,108 issued to H. Perkel on July 6, 1971. entitled "Control System for Spinning Bodies," and in U.S. Pat. No. 4,084,772 issued to L. Muhlfelder on Apr. 8, 1978, entitled "Roll/Yaw Body Steering for Momentum Biased Spacecraft."

A bias-momentum spacecraft system using paired counter-rotating wheels with net momentum for energy storage and attitude stabilization is described by M. H. Kaplan in an article entitled "Stabilization Aspects of a Wheel Energy Storage and Attitude Control System for Geostationary Satellites," published by COMSAT TECHNICAL REVIEW, Vol. 4, No. 1, Spring 1974, pp. 21–40.

A system utilizing a plurality of paired counter-rotating wheels for stabilization and control purposes in a zero-momentum system is described in U.S. Pat. No. 3,424,401, issued Jan. 28, 1969 to K. M. Maurer.

There is a need for a system providing exclusive closed loop roll control damping in a momentum biased satellite.

According to the present invention, a spacecraft, for example, of the dual-spin type employing a momentum wheel for stabilization is provided with a pair of relatively small counter-rotating flywheels whose spin axes are parallel to the spacecraft yaw axis. Closed loop nulling of roll errors only is achieved by increasing or decreasing the angular speed of one of the two wheels with respect to each other in response to sensed attitude errors about the roll axis.

Figure 1:
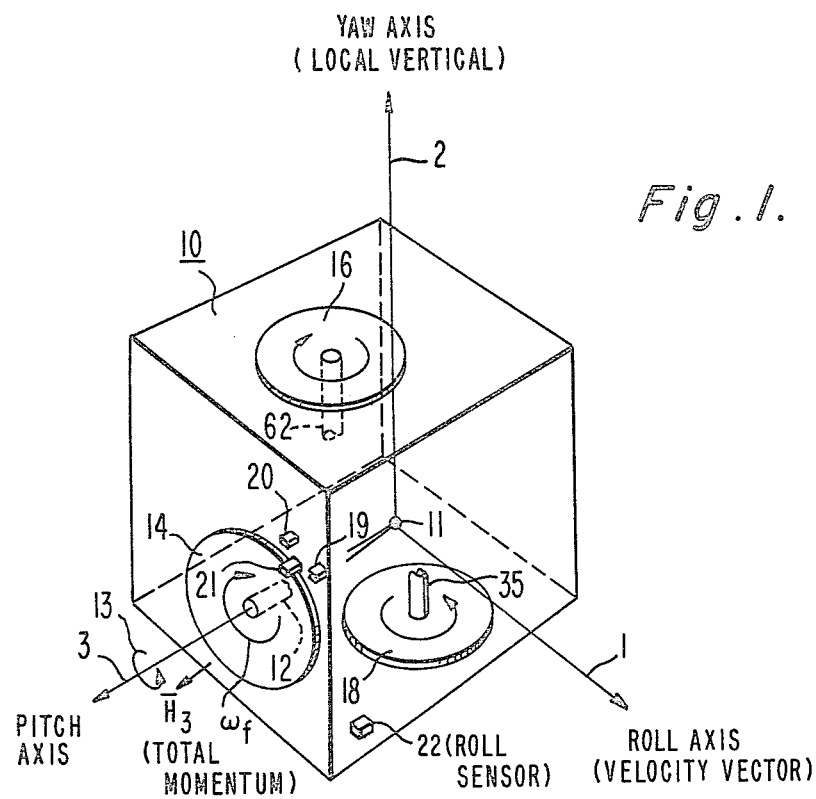
FIG. 1 is perspective diagrammatic showing of a dual-spin spacecraft having a conventional pitch axis bias momentum wheel and further provided with the two yaw axis flywheels according to one embodiment of the invention.

Referring to FIG. 1, there is shown a satellite 10 having a body of any suitable or desired shape. Extending from the center of mass 11 are three mutually perpendicular spacecraft axes designated as 1, 2 and 3, corresponding to designated roll, yaw, and pitch axes, respectively. The pitch axis 3 is defined to be that direction in which the spacecraft 10 is colinear with the total angular momentum vector $\overline{H}_3$ when satellite 10 is operating in its intended mission. The pitch axis 3 is parallel to and not necessarily coincident with the axis 12 about which a bias momentum wheel 14 is rotated.

The sign convention is that the pitch axis as shown in FIG. 1 is positive and is in the positive direction of the angular momentum vector $\overline{H}_3$. Thus, according to the usual convention in this art, the total angular momentum $\overline{H}_3$ possessed by the satellite 10 is equivalent to having the body 10 rotating about the pitch axis 3 as shown along the arrow direction 13 representing the angular velocity ($\omega_3$) about the pitch axis 3. The axis-system is defined and used herein according to the usual convention is right handed in the order 1-2-3.

For the purposes of describing one embodiment of the present invention, the momentum vector $\overline{H}_3$ is assumed to be colinear with the pitch axis 3. Further, the pitch axis 3 is normal to the plane of the orbit of the satellite and the yaw axis 2 is nominally oriented to point to the center of the earth and, as such, is termed to the local vertical. The roll axis 1 is parallel with the velocity vector of the orbit of the spacecraft 10 and as such is coincident with movement of the satellite in orbit.

Figure 2:
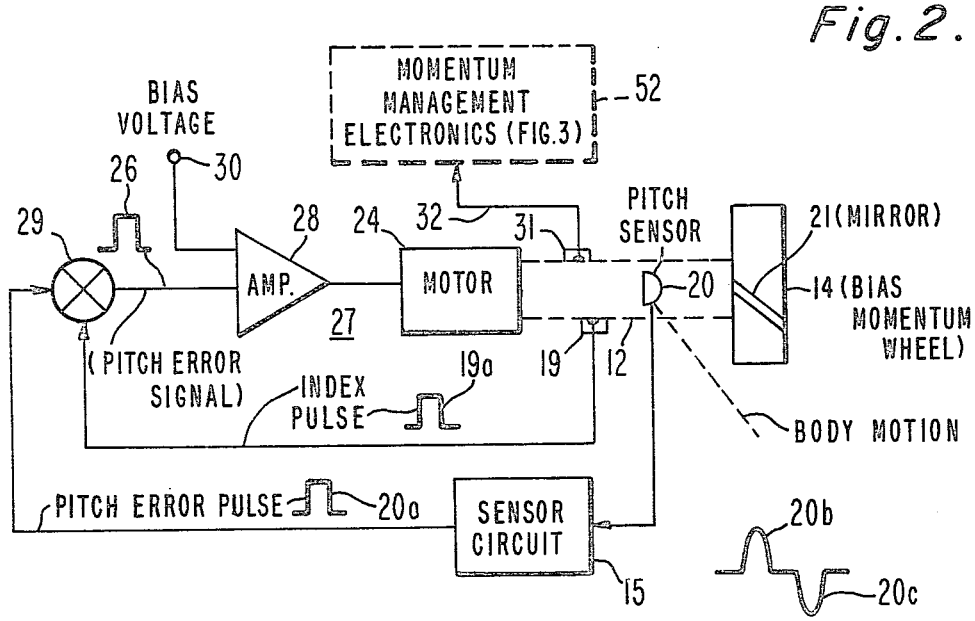
FIG. 2 is a block diagram of the pitch axis control loop.

The bias momentum wheel 14 is driven by motor 24 (FIG. 2) via shaft 12 in a conventional pitch loop 27 illustrated in the block diagram of FIG. 2, to be described. A pair of flywheels 16 and 18, each driven by a respectively associated motor (60, 34, FIG. 3) are mounted on respective shafts (62, 35) whose axes are parallel with each other with the yaw axis 2; however, the shaft axes are not necessarily coincident with one another or with the yaw axis 2.

Suitable and well-known pitch loop means are provided to determine the attitude reference of the spacecraft 10 to inertial space or with reference to a particular spatial body about which it is orbiting, such as the earth. Accordingly, in one form of a suitable pitch loop (FIG. 2, to be described) an infrared (IR) sensor 20 is fixed to the structure of the spacecraft body to be responsive to a radiation reflecting mirror 21 positioned on bias momentum wheel 14. The sensor 20 is operatively connected within the pitch loop system 27 (FIG. 2) to a sensor circuit 15 to generate an earth horizon pulse signal 20a indicating errors in pitch to determine the attitude of the spacecraft relative to the earth.

To determine motion of the satellite 10 about the roll axis 1, a suitable infrared sensor 22 is suitably positioned in a fixed position on spacecraft 10. Sensor 22 is coupled to the roll control loop illustrated in FIG. 3 as will be described.

Earth reference sensors, particularly earth horizon sensors, are well known. Any sensor which provides a signal manifesting position or motion relative to a selected axis (roll or pitch) may be used to practice the invention. One type for scanning the horizon utilizes two sensors to scan two optical paths across the earth's surface as described in the aforementioned Perkel U.S. Pat. No. 3,834,653. This type of sensor will be described more fully in the discussion of FIG. 4. Another type of horizon sensor utilizes a single sensor that scans the earth's surface to provide two horizon crossing signals, the midpoint between such signals being compared to a zero index position reference located on the satellite structure to provide a signal indicative of attitude error. Second sensors of the type selected may be used for redundancy purposes or to improve accuracy.

For a more detailed description of such sensors see, for example, a pamphlet entitled "Improved ITOS Attitude Control System with Hall Generator Brushless Motor and Earth-Splitting Technique," by William M. Peacock, published by Goddard Space Flight Center, Greenbelt, Md, 1971, (Preprint number X-480-71-404) which describes an earth splitting sensor and circuit. See also a pamphlet entitled "ITOS-Night-Day Meteorological Satellite," published by U.S. Superintendent of Documents, prepared by TOS Project/Goddard Space Flight Center for other techniques for determining pitch-errors and roll-yaw errors.

In general, a sensor is suitably positioned on the spacecraft and utilized in the control circuits to provide either positional information (pitch) or movement information (roll) as well known in the art.

The present embodiment utilizes the so-called split-horizon sensor to determine pitch attitude errors. The embodiment being described utilizes a pitch-horizon sensor, that is essentially rotational in motion, that is, one which is responding to a reflecting mirror mounted on the rotating momentum wheel or flywheel. Nevertheless, it will be appreciated that other types of pitch-horizon sensors or reference sensors may be used. Thus, for example, a body fixed pendulum-type sensor which scans back and forth in a pendulum action with enough amplitude to extend across both horizon crossings of the earth (as viewed from the orbiting spacecraft) will provide adequate reference position signals that are needed to practice the present invention to control the pitch (position or attitude) loop.

Refer now to FIG. 2 which shows a suitable closed loop pitch axis control system 27 for controlling the pitch attitude of a spacecraft in which the present invention may be practiced. The system comprises motor 24 (a.c. or d.c. type) which rotates the bias momentum wheel 14 via shaft 12. The pitch horizon sensor 20, preferably sensitive to light in the infrared range, is positioned in operative relation with mirror 21 that is oriented to deflect infrared signals from the earth to illuminate sensor 20 as the wheel 14 is rotated with an angular velocity of $\omega_f$. A suitable index pulse generator 19 is located on the spacecraft to represent the position of zero attitude error (points 19b and 19c, FIG. 4 to be described) relative to the earth, as known in the art, to generate an index signal pulse 19a upon each rotation of wheel 14.

The IR signals generated by the optical scanning of the earth are received by sensor 20 which generates two horizon crossing pulses 20b and 20c on each rotation of wheel 14. Sensor circuit 15 responsive to the two horizon crossing pulses 20b and 20c generates a split horizon pulse 20a. A suitable sensor circuit is described in the aforementioned pamphlet by W. M. Peacock. An error detector 29, suitably a comparator, responds to index pulse 19a and split horizon pulse 20a to generator a pitch error signal 26 manifesting the pitch attitude error based on the difference in arrival time of the respective pulses 19a and 20a. A suitable amplifier 28, typically an operational and power amplifier, responds to pitch error signals 26 and bias voltage for motor 24 to maintain or change its speed as a function of the error detected. When the index pulse 19a is received simultaneously with the split horizon pulse 20a, indicating thereby no error, the pitch error signal 26 is zero or some value of a reference bias signal (30) that is calibrated for zero error reference. The zero error reference voltage to motor 24 is such as to maintain the speed of the wheel 14 at the predetermined value required to maintain the predetermined total momentum of the system ($\overline{H}_3$). The bias voltage 30 serves to calibrate or bias amplifier 28 to the desired zero error condition manifested by a constant speed for a speed pitch attitude.

Figure 3:
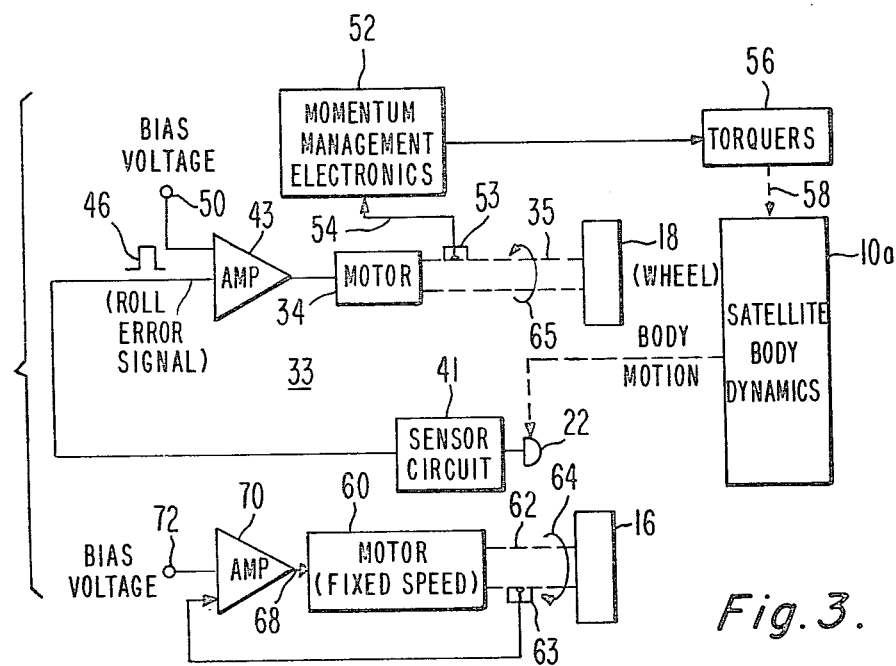
FIG. 3 is a block diagram of the roll axis control loop.

In order to provide a means to change the momentum of the system, when required, conventional momentum management electronics (52) to be further described with respect to FIG. 3, is provided with a speed indicating control signal as by a tachometer 31 via path 32 indicating the speed of motor 24 manifesting thereby the momentum ($\overline{H}_3$) of the system with respect to the pitch axis.

A suitable motor 24 is a brushless d.c. type motor that operates at a speed that is a function of its d.c. input, and the friction and torque load on the shaft 12. The momentum wheel 14, in the absence of torques about the shaft 12, will rotate at a predetermined speed for establishing the bias momentum of the spacecraft ($h_3$) when the momentum vector is aligned with the pitch axis 3. Amplifier 28 includes suitable electronics to respond to a pitch error signal 26 and to generate d.c. voltage to change the speed of motor 24 to correct the error in pitch as known in the art. Error detector 29 develops an error voltage, the duration of which is proportional to the time difference between the horizon pulse 20a and index pulse 19a. No pulse indicates that there is no attitude error.

In the operation of the system of FIG. 2, if the pitch axis should change due to disturbance torques created internally of the satellite system, the magnitude of the system momentum $\overline{H}_3$ does not change. The pitch error pulse produced causes (via elements 29, 28 and 24) the speed of the momentum wheel 14 to change in an amount such as to reorient the satellite 10 to the predetermined spin axis orientation. As the spin axis error reduces to zero, the pitch error pulse also reduces in duration until when the error is zero the pitch error pulse also reduces to zero. At this time wheel 14 is again spinning at its reference speed.

If the pitch axis should change due to externally generated torques, this will change the system momentum $\overline{H}_3$. The change in the magnitude of the system momentum ($\overline{H}_3$) will be manifested as a change in the reference speed of momentum wheel 14. Typically such changes may be in the order of twice the reference speed of wheel 14. Furthermore, changes in the speed of wheel 14 for controlling pitch errors are usually smaller than the speed changes caused by torques from external sources. The system is arranged to provide momentum management when the change in the reference momentum exceeds a predetermined threshold value. The change in momentum of the system will be indicated to the momentum management electronics by the tachometer 31 signal. The system 52 will, after a predetermined threshold speed, activate torquers 56 on the satellite (as will be further discussed in connection with FIG. 3) which will supply momentum to the system in a sense and amount sufficient to offset the momentum change to the system caused by externally generated torques. When this is done the system of FIG. 2 will be able to reduce the pitch angle error to zero and the wheel 14 will spin at its reference speed.

Reference is now made to FIG. 3 which shows the control circuit for the two counter-rotating flywheels 16 and 18. The control of flywheel 18 is achieved in a closed loop system (33) similar to the closed loop pitch control 27 (FIG. 2) for controlling the rotation of momentum wheel 14. Control loop 33 thus comprises a brushless d.c. motor 34 coupled to drive wheel 18 via a shaft 35 in a direction of arrow 65. A sensor circuit 41, similar to sensor circuit 15 of pitch loop 27 (FIG. 2), is responsive to signals from horizon sensor 22 to generate a roll error signal 46 as one input to amplifier 43. Amplifier 43 generates an operating voltage for motor 34 to maintain its speed at a predetermined value determined by bias voltage 50 applied as a second input to amplifier 43 or to change the speed in accordance with the superimposed error signal 46. A signal corresponding to the speed of motor 34, sensed as by a tachometer 53, is applied to momentum management electronics 52 via path 54.

Wheel 16 is operated in a tachometer controlled loop at a fixed speed by motor 60 coupled to shaft 62 rotating in the direction indicated by arrow 64, opposite the direction of the rotation of wheel 18. Motor 60 is energized via path 68 by amplified 70. A predetermined and fixed bias voltage is applied at terminal 72 to energize the amplifier 70 for maintaining the speed and direction of motor 60 to predetermined values. A tachometer 63 coupled to shaft 62 provides a signal to amplifier 70 indicative of the speed of motor 60 to modify control voltage as the load on the motor 60 may change due to disturbance torques to thereby keep the speed of motor 60 constant in a known manner.

Conventional momentum management electronics 52 responding to speed signals from tachometer 53 (in addition to speed signals from tachometer 31 of FIG. 2) generates suitable signals for energizing torquers 56 for developing control torques on the body 10 via torque paths 58 to change the respective speeds of wheels 18 and 14 to return to their desired reference speed representing the desired momentum of the system. A system using torquers for managing momentum is described in U.S. Pat. No. 4,071,211, issued on Jan. 31, 1978 to L. Muhlfelder, J. E. Keigler and Brian Stewart. In a typical system if the speed of wheel 18 (as well as momentum wheel 14) is in excess of a predetermined threshold value, the management electronics 52 is arranged to generate control signals to activate the torquers when the threshold value is reached. In this way the attitude control system for both pitch and roll over error control will function with predetermined limits of error.

Torquers 56 may be thrusters suitably positioned on the spacecraft in a manner known in the art to effect the desired external body torques about the roll or pitch axes. It will be recalled that motor 24 in the pitch loop 27 (FIG. 2) also provides a signal to electronics 52, whereby excessive speed changes of motor 24 will effect a torque 58 to add or subtract momentum to satellite 10 in response to control signals from momentum management electonics 52. Torquers 56, shown for convenience as a single block in the drawing, are suitably distributed and oriented on the satellite to generate thrusts by jets to achieve the desired torquing effect in a known manner.

Alternatively the required torques may be achieved using magnetic torquers suitably positioned on the satellite as known in the art to react when energized with the magnetic field of the earth. Magnetic torquing preferred since no significant nutation is produced during operation by the interaction with the earth's magnetic field. Thrusters, on the other hand, do produce additional nutation which undesirably cause significant attitude transients. One example of magnetic torquing for the purpose of reducing excessing momentum is described in U.S. Pat. No. 4,010,921, issued Mar. 8, 1977, to J. S. Pistiner and Ludwig Muhlfelder.

The electrical circuits (amplifier 43 and motor 34, for example) for operating the wheels (18, 14) and the momentum management torquers (56) are conventional in accordance with design techniques well known in the art. A detailed description of typical control circuits used in a three-axis control system but useful in practicing the present invention are described in U.S. Pat. No. 3,998,409, entitled "Minimization of Spacecraft Attitude Error Due to Wheel Speed Reversal," by Josef Siegfried Pistiner, issued Dec. 21, 1976, and U.S. Pat. No. 3,999,729, entitled "Backup Wheel for a Three Axis Reaction Wheel Spacecraft," by Ludwig Muhlfelder and Norman Urton Huffmaster, issued Dec. 28, 2976.

An orbiting satellite having stored angular momentum can be oriented in such a way that the direction defined by the angular momentum vector $\overline{H}_3$ is aligned with the pitch axis 3. Both nutation and roll errors are minized by the control means according to the present invention, which includes the counter-rotating wheels 16 and 18 parallel to the yaw axis (2), sensor 38, and the associated electronic circuits in a closed loop without the need of ground control command.

In operation of the system, it is assumed that satellite 10 is in orbit and has been properly oriented such that the momentum vector $\overline{H}_3$ is coincident with the pitch axis 3, the bias momentum wheel 14 is operating at its reference angular velocity $\omega_f$ (typically corresponding to momentum in the range of 200 to 2,000 inch-poundseconds) and counterrotating wheels 16 and 18 are (without nutation or roll error) operating normally with a net momentum of zero. However, with nutation and/or roll errors present, yaw wheels 16 and 18 operate with a net resultant momentum that is significantly smaller than the momentum of bias momentum wheel 14. A typical value of the maximum net angular momentum developed by yaw axis wheels 16 and 18 is in the order of 10 inch- pound-seconds. It should be appreciated, nevertheless, that when the satellite system is in nutation-free and error-free operation whereby the yaw axis is precisely normal to the earth's surface and accordingly whereby the error in roll attitude and nutation is zero, the speed of wheels 18 and 16 will be equal and thus the net momentum contributed by these wheels to the total momentum ($\overline{H_3}$) of the satellite is zero.

The operation of the roll error control system of FIG. 3 is similar to the operation of the pitch error control system of FIG. 2 described hereinabove. Errors in roll sensed by sensor 22 provide roll error pulses 46 which change the speed of wheel 18 in an amount such as to reorient the satellite 10 to correct for roll errors. As the roll errors reduce to zero, the pulse 46 also reduces to zero at which time the speed of wheel 18 is at its reference speed. If the roll errors are due to externally generated torques, the momentum changes caused by said disturbances manifested by changes in the speed of wheel 18 will be corrected for by momentum management electronics 52 as described above. After the momentum has been returned to its reference value and the wheel speed 18 is at its reference value, the closed loop roll control system (27) will be able to reduce roll errors to zero.

Figure 4:
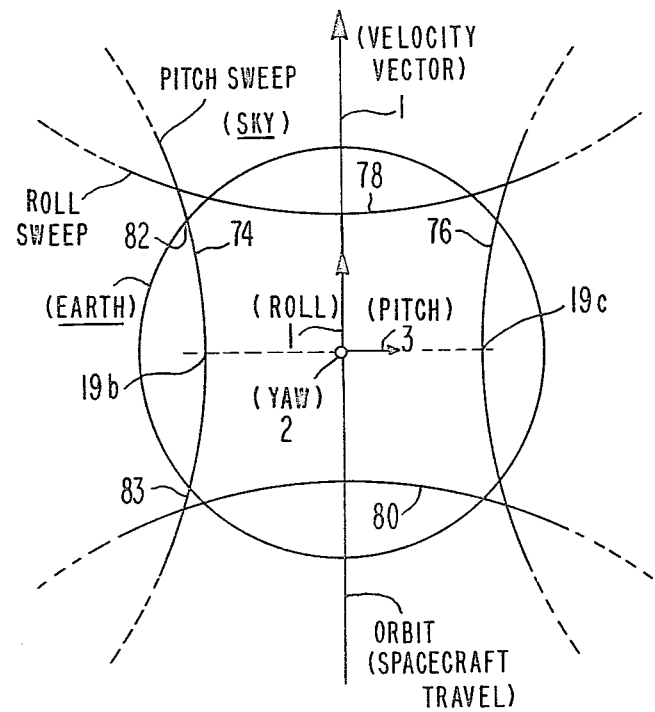
FIG. 4 is a schematic of pitch axis and roll axis sensor mirror sweep paths in relation to the orbit path.

As described above, bias momentum wheel 14 rotates mirror 21 to optically scan the surface of the earth, mirror 21 being positioned to reflect the horizon IR image signals to sensor 20. The arrangement is such that pitch wheel mirror 21 will sweep path 74 as indicated in FIG. 4, across the earth's surface. The second path 76 is swept if a second redundant mirror and sensor is used. The velocity vector of the satellite is coincident with the roll axis 1, and the orbit path of the satellite 10 over the earth 73, as shown in FIG. 4. The orientation of the satellite in this configuration as shown by the axis 1, 2, 3 in FIG. 4, can be readily to the spacecraft as indicated in FIG. 1.

By way of summarizing the operation, as the pitch wheel mirror 21 sweeps the optical sweep across the earth, pitch horizon sensor 20 will determine the interface of the earth with the sky 82 and the sky with the earth 83 indicating thereby the two horizon crossings that are determined for each revolution or rotation of the mirror. Once per revolution, the index pulse 19a will be generated and applied to te error detector 24 which, in turn, in response to the split horizon pulse 20a, will generate a pitch error signal 26 that will modify the output of amplifier 28 to cause motor 24 to either increase or decrease in speed to change thereby the momentum of wheel 14 to correct the attitude of the spacecraft along the pitch axis in a manner well known in the art. Point 19b on sweep 74 (FIG. 4) is the location of a zero attitude error, noting that it is along the pitch axis 3. Point 19c is a corresponding zero attitude point on sweep 76 for the second pitch error sensing system is used.

For a type of roll horizon sensor 22 which operates to provide a sweep across the earth, path 78 will determine the interface and thus the length of the arc for providing the roll attitude reference. A second, redundant sensor, if provided, will sweep path 80.

Nutation and roll errors about the roll axis 1 are detected by horizon sensor 22 providing a signal of such errors to sensor circuit 41 (FIG. 3). Sensor circuit 41 generates a roll error signal 46 whose duration represents nutation or roll error. Any roll error or nutation manifested by signal 46 modifies the output of amplifier 43 to alter the speed of motor 34 and thus the speed of wheel 18 to correct for the error until the error signal 46 is zero. A change in the speed of wheel 18 provides a net momentum to the system (the speed of wheel 16 being a constant) along the yaw axis 2 of sufficient magnitude to counteract the momentum manifested by the nutation, about roll axis 1. Nutation, as well understood in the art, itself manifests undesired momentum about an axis transverse to the pitch axis 3.

According to the present invention, the pair of counter-rotating wheels (16 and 18) positioned parallel with te yaw axis (2) provides a means for controlling simultaneously not only the orientation of the satellite about its roll axis but also to provide active nutation damping nutation in the roll/yaw plane. The horizon sensor 22 in the roll loop 33 in response to any deviations, whether caused by nutation (movement) or roll error (displacement), causes wheel 18 to change its speed and thus its momentum to effect the desired correction of error manifested or sensed by horizon detector 22.

While the embodiment of FIG. 3 provides for a fixed speed motor 60 and a variable speed motor 34 whereby the change in speed of motor 34 alone is used to correct the roll errors, motor 60 may instead be a variable speed motor. A second independent sensor and sensor circuit may then be used for motor 60 in a manner similar to that described for the closed-loop control circuit 33 for motor 34. In this alternative system when there is a roll error, there will be a roll error signal of one sense applied to amplifier 43 and a roll error signal of opposite sense applied to amplifier 70 for driving the two wheels 16 and 18 in opposite directions at different speeds and in a sense to reorient the satellite to reduce the roll error to zero. When zero roll error is reached, the roll error signals will reduce to zero and the two wheels again will be spinning at the same speed (and in opposite directions). With respect to system 52, the signal it senses can be one proportional to the difference in velocities of the two wheels 16 and 18 and this signal will be used to actuate the torquers only when it is above a predetermined threshold value similarly to what has already been discussed.

It should be understood, as well known in the art, that nutation is the result of exchange of some momentum from the pitch axis to the roll/yaw plane. Thus, there is usually no net system momentum change, except when nutation is caused initially by external torques. On the other hand, roll attitude error (i.e., angular displacement about the roll axis) is always caused by external torques (such as caused by solar pressure, gravity gradients, aerodynamic effects, etc.) which change the momentum vector of the satellite. Thus, deviations from a predetermined system momentum manifested by roll attitude error must be compensated for by the momentum management torques as described hereinabove. Nevertheless, the system according to the present invention corrects automatically for nutation and/or roll attitude errors, however caused, and maintains the system momentum to a predetermined value.

It should be appreciated that yaw axis control is effected automatically due to gyroscopic coupling by the quarter-orbit interchange between the roll (1) and yaw (2) axes that occurs as the satellite moves in orbit while the pitch axis (3) is maintained parallel to the orbit normal.

The invention thus provides a means to control roll errors independently of other attitude control systems on board a satellite. The pair of counter-rotating yaw axis wheels nominally operating at net zero-momentum, avoids the problem of the prior art in which a single wheel's direction of rotation must be rotated through a zero-value in order to correct errors. The principle of the present invention is based on merely increasing or decreasing the speed of one wheel of the pair of wheels to control roll errors. In this way the problem of control wheel malfunctioning due to low speeds and directions reversals is obviated.

What is claimed is:

1. An attitude control system for a momentum biased satellite having pitch, roll and yaw axis that are each mutually perpendicular to each other and further having a pitch axis control loop including a motor for driving a bias momentum wheel about an axis parallel to the pitch axis, and further including means to sense motion of said satellite with respect to said pitch axis and provide a signal manifesting such motion, and means responsive to said sensor signal for correcting pitch axis motion errors relative to a predetermined reference, said system comprising:
    a first wheel oriented to spin about an axis parallel to said yaw axis in one rotation direction;
    a second wheel oriented to spin in the opposite direction from said one rotation direction about an axis parallel to said first wheel axis;
    a first means for driving said first wheel at a predetermined constant speed;
    a second means for driving said second wheel at a variable speed, said seconds means including sensor means oriented to sense motion of said satellite with respect to said roll axis and to generate a signal manifesting roll axis motion; and
    means including a closed loop control responsive to said signal manifesting roll axis motion for controlling the speed of said second motor to rotate said satellite about said roll axis to reduce errors in motion relative to said predetermined reference.

2. A system according to claim 1 further including speed responsive means for sensing the speed of said second wheel and generating a speed signal indicative of said speed, and torque generating means responsive to said speed signal exceeding a predetermined value for torquing said satellite to change the momentum of said satellite to maintain the momentum within predetermined limits.

3. A system according to claim 2 wherein said torquing means comprises magnetic means for reacting with the earth's magnetic field.

4. A system according to claim 2 wherein said torquing means comprises thruster means.

5. A method of controlling the attitude of a momentum biased satellite having orthogonal pitch, roll, and yaw axes, the pitch axis being colinear with the momentum vector of the satellite, comprising the steps of:
    operating a first spinning wheel parallel to the yaw axis at a predetermined constant speed in a first rotation direction;
    operating a second spinning wheel parallel to the yaw axis at a controllable speed nominally equal to the speed of said first wheel in a second rotation direction opposite to said first rotation direction; and
    changing the speed of said second wheel in response to roll axis motion error signals to reduce errors in motion relative to a predetermined reference.

6. A method according to claim 5 further comprising the step of:
    controlling the momentum of the satellite to a predetermined value by torquing the satellite in a direction to negate disturbance torques.

7. A system for reducing errors in the roll axis orientation of a spacecraft relative to a reference roll axis direction, comprising, in combination:
    first and second wheels on the spacecraft rotatable about respective axes parallel to the yaw axis of the spacecraft;
    first and second drive means, the first coupled to the first wheel and the second coupled to the second wheel for rotating the respective wheels in opposite directions about their respective axes, the two drive means rotating the two wheels at the same speed when the roll axis of the spacecraft is aligned with said reference axis;
    means responsive to te departure of the roll axis of the spacecraft from said reference orientation for producing an error signal; and
    means responsive to said error signal for changing the speed of at least one of said drive means for thereby producing a difference other than zero in the speed of said two wheels in a sense to reduce toward zero said error in roll axis orientation.

8. A system as set forth in claim 7 wherein said first drive means comprises a constant speed drive means and said second drive means comprises a variable speed drive means, and wherein said means responsive to said error signal comprises said second drive means.

9. A system as set forth in claim 8 further including means responsive to a difference between the speeds of said first and second wheels of greater than a given value for changing the momentum of the spacecraft in a sense and amount to return the total momentum of the spacecraft to a reference value.

* * * * *

UNITED STATES PATENT AND TRADEMARK OFFICE
CERTIFICATE OF CORRECTION

PATENT NO. : 4,230,294

DATED : October 28, 1980

INVENTOR(S) : Josef S. Pistiner

It is certified that error appears in the above-identified patent and that said Letters Patent is hereby corrected as shown below:

Col. 1, line 37, "abroad" should be --aboard--.

Col. 4, line 25, "generator" should be --generate--.

Col. 4, line 30, insert after "voltage", "30 to provide a control and operating voltage".

Col. 4, line 40 "$(\overline{H_3^-})$" should be --$(\overline{H}_3)$--.

Col. 4, line 42 "speed" (second occurrence) should be --zero--.

Col. 4, line 57 "$(h_3)$" should be --$(H_3)$--.

Col. 5, line 62, after "modify" insert "the motor".

Col. 6, line 14, "over" should be deleted.

Col. 6, line 24, "electonics" should be --electronics--.

Col. 6, line 32, after "torquing" insert "is".

Col. 6, line 53, "2976" should be --1976--.

Col. 6, line 58, "minized" should be --minimized--.

Col. 7, line 1, "counterrotating" should be --counter-rotating--.

Col. 7, line 16, "$(\overline{H_3^-})$" should be --$(\overline{H}_3)$--.

Col. 7, line 46, after "readily" insert "related".

Col. 8, line 21, "te" should be --the--.

UNITED STATES PATENT AND TRADEMARK OFFICE
CERTIFICATE OF CORRECTION

PATENT NO. : 4,230,294　　　　　　　　　Page 2 of 2

DATED : October 28, 1980

INVENTOR(S): Josef S. Pistiner

It is certified that error appears in the above-identified patent and that said Letters Patent is hereby corrected as shown below:

Col. 9, line 13, after "correct" insert "for".

Col. 9, line 22, "axis" should be --axes--.

Col. 9, line 40, "seconds" should be --second--.

Col. 10, line 38, "te" should be --the--.

Signed and Sealed this

Twenty-fourth Day of March 1981

[SEAL]

Attest:

RENE D. TEGTMEYER

Attesting Officer　　　　Acting Commissioner of Patents and Trademarks